US011061857B2

(12) United States Patent
Sima et al.

(10) Patent No.: US 11,061,857 B2
(45) Date of Patent: Jul. 13, 2021

(54) DATA PROCESSING METHOD AND DEVICE (71) Applicant: Huawei Technologies Co., Ltd., Shenzhen (CN)

(72) Inventors: Jinghua Sima, Shenzhen (CN); Xiyong Wang, Shenzhen (CN); Yuying Zeng, Shenzhen (CN)

(73) Assignee: HUAWEI TECHNOLOGIES, CO., LTD., Shenzhen (CN)

(*) Notice: Subject to any disclaimer, the term of this patent is extended or adjusted under 35 U.S.C. 154(b) by 344 days.

(21) Appl. No.: 16/072,811

(22) PCT Filed: Jan. 26, 2016

(86) PCT No.: PCT/CN2016/072118
§ 371 (c)(1),
(2) Date: Jul. 25, 2018

(87) PCT Pub. No.: WO2017/128032
PCT Pub. Date: Aug. 3, 2017

(65) Prior Publication Data
US 2019/0034443 A1 Jan. 31, 2019

(51) Int. Cl.
G06F 16/13 (2019.01)
G06F 8/61 (2018.01)
(Continued)

(52) U.S. Cl.
CPC ............ G06F 16/13 (2019.01); G06F 8/63 (2013.01); G06F 9/44557 (2013.01);
(Continued)

(58) Field of Classification Search
CPC .................................................. G06F 16/1744
See application file for complete search history.

(56) References Cited

U.S. PATENT DOCUMENTS 5,675,789 A * 10/1997 Ishii ...................... G06F 3/0601
9,007,239 B1 * 4/2015 Lissack .................. G06F 9/544
341/50
(Continued)

FOREIGN PATENT DOCUMENTS

CN 101252749 A 8/2008
CN 102792296 A 11/2012
(Continued)

OTHER PUBLICATIONS

Hyun, S., et al., "LeCramFS: An Efficient Compressed File System for Flash-Base Portable Consumer Devices," XP011381806, IEEE Contributed Paper Manuscript, Apr. 15, 2007, pp. 481-488.
(Continued)

Primary Examiner — William Spieler
(74) Attorney, Agent, or Firm — Conley Rose, P.C.

(57) ABSTRACT

A data processing method and device, where the method includes obtaining a usage frequency value of software, compressing a target file of the software to obtain a compressed file when the usage frequency value is less than a preset usage frequency value, receiving a startup instruction for starting the software, querying the compressed file of the software, and decompressing the compressed file using a high-priority process to obtain the target file, where the high-priority process is performed as an essential highest-priority process relative to another process, and starting the software based on the target file.

20 Claims, 2 Drawing Sheets (51) Int. Cl.

| | | |
|---|---|---|
| *G06F 9/48* | (2006.01) | |
| *G06F 9/455* | (2018.01) | |
| *G06F 9/445* | (2018.01) | |
| *G06F 16/16* | (2019.01) | |
| *G06F 16/174* | (2019.01) | |
| *G06F 16/17* | (2019.01) | |

(52) U.S. Cl.
CPC .......... *G06F 9/44578* (2013.01); *G06F 9/455* (2013.01); *G06F 9/4818* (2013.01); *G06F 16/162* (2019.01); *G06F 16/1734* (2019.01); *G06F 16/1744* (2019.01); *G06F 9/48* (2013.01)

(56) References Cited

U.S. PATENT DOCUMENTS

| | | | |
|---|---|---|---|
| 2002/0143792 A1* | 10/2002 | Belu | G06F 16/17 |
| 2004/0260840 A1* | 12/2004 | Scian | G06F 8/4434 |
| | | | 709/247 |
| 2011/0125722 A1* | 5/2011 | Rao | G06F 16/1748 |
| | | | 707/693 |
| 2012/0072676 A1 | 3/2012 | Accapadi et al. | |
| 2012/0254133 A1* | 10/2012 | Hen-Tov | G06F 16/22 |
| | | | 707/693 |
| 2013/0212077 A1 | 8/2013 | Chai et al. | |
| 2015/0161155 A1* | 6/2015 | Pletcher | G06F 3/0643 |
| | | | 707/693 |
| 2015/0339059 A1* | 11/2015 | Kang | G06F 3/064 |
| | | | 711/154 |

FOREIGN PATENT DOCUMENTS

| | | |
|---|---|---|
| CN | 103218224 A | 7/2013 |
| CN | 104461504 A | 3/2015 |
| CN | 104737137 A | 6/2015 |
| CN | 105005504 A | 10/2015 |
| EP | 3113019 A1 | 1/2017 |

OTHER PUBLICATIONS

BENAVIDES, T., et al., "The Enabling of an Execute-In-Place Architecture to Reduce the Embedded System Memory Footprint and Boot Time," XP055399069, Journal of Computers, vol. 3, No. 1, Jan. 2008, pp. 79-89.
Fei, N., et al., "Optimizing YAFFS2 for small-sized NAND device," XP055564152, World Congress on Computer Science and Information Engineering, Mar. 1, 2009, pp. 328-330.
Debray, S., et al.,"Profile-Guided Code Compression," XP058127983, Published by ACM 2002 Article, May 17, 2002, pp. 95-105.
Foreign Communication From a Counterpart Application, European Application No. 16886919.6, Extended European Search Report dated Mar. 19, 2019, 13 pages.
Machine Translation and Abstract of Chinese Publication No. CN101252749, Aug. 27, 2008, 18 pages.
Machine Translation and Abstract of Chinese Publication No. CN103218224, Jul. 24, 2013, 15 pages.
Machine Translation and Abstract of Chinese Publication No. CN104461504, Mar. 25, 2015, 21 pages.
Foreign Communication From a Counterpart Application, Chinese Application No. 201680002848.5, Chinese Office Action dated Apr. 24, 2019, 7 pages.
Machine Translation and Abstract of Chinese Publication No. CN105005504, Oct. 28, 2015, 15 pages.
Foreign Communication From a Counterpart Application, PCT Application No. PCT/CN2016/072118, English Translation of International Search Report dated Aug. 31, 2016, 2 pages.
Foreign Communication From a Counterpart Application, PCT Application No. PCT/CN2016/072118, English Translation of Written Opinion dated Aug. 31, 2016, 7 pages.

\* cited by examiner

DATA PROCESSING METHOD AND DEVICE

CROSS-REFERENCE TO RELATED APPLICATIONS

This application is a U.S. National Stage of International Patent Application No. PCT/CN2016/072118 filed on Jan. 26, 2016, which is hereby incorporated by reference in its entirety.

TECHNICAL FIELD

The present invention relates to the communications field, and in particular, to a data processing method and device.

BACKGROUND

With popularization of intelligent devices, a variety of software is loaded in the device, and frequency of using each piece of software by different groups of people is different. Consequently, there may be some software whose frequency of use is extremely low (low frequency software), and some large files may be used by the low frequency software.

When more software is loaded in the device, there may be more corresponding low frequency software and more files corresponding to the low frequency software.

However, system resources of the device are limited, and when the file corresponding to the low frequency software occupies a large amount of system resources, execution efficiency of other software is affected. Consequently, the device cannot run smoothly, and user experience is affected.

SUMMARY

Embodiments of this application provide a data processing method and device, to compress a target file of software when a usage frequency value of the software is less than a first threshold, and after a startup instruction for starting the software is received, perform decompression by using a high-priority process. In this way, system resources can be more effectively saved, and a running speed and smoothness of the software can be improved.

According to a first aspect, an embodiment of this application provides a data processing method, including:

obtaining a usage frequency value of software.

In this embodiment of this application, the usage frequency value of the software may be obtained in multiple possible implementations. Data may be recorded once each time the software is started, or data may be recorded once only after the software runs for preset duration, provided that times of using the software can be correctly reflected. In addition, the preset duration may be set by a user, and is not specifically limited herein.

When the usage frequency value is less than a first threshold, a target file of the software is compressed to obtain a compressed file.

In the solution provided in this embodiment of this application, the target file of the software may be compressed by using multiple compression algorithms, including but not limited to a zip format, a rar format, and a tar format. A specific method is not limited herein.

After compression is completed, if a startup instruction including an identifier of the software is received, the compressed file of the software is queried according to the identifier of the software in the startup instruction. After the compressed file of the software is queried, the compressed file is decompressed by using a high-priority process, to obtain the target file, and the high-priority process herein is performed as an essential highest-priority process relative to another process. After decompression of the compressed file is completed, the software can run based on the target file.

In this embodiment of this application, the software may be suspended and does not run in the decompression process, until the decompression of the compressed file is completed to obtain the target file. This method may be used as an optional solution, and this is not limited herein.

In the technical solution provided in this application, when the usage frequency value of the software is less than a first threshold, the target file of the software is compressed. After the startup instruction for starting the software is received, the software is suspended, and decompression is performed by using the high-priority process. In this way, system resources can be more effectively saved, and a running speed and smoothness of the software can be improved.

Optionally, in this embodiment of this application, when the software is usually used, statistics about times of using the software in a unit time are collected as the usage frequency value of the software.

In this embodiment of this application, the unit time may be one month or may be one week, and duration of the unit time may be set by the user, and is not limited herein.

In the solution provided in this application, statistics about times of using the software are collected at any time. In this way, the usage frequency of the software may be clearly known.

Optionally, in this embodiment of this application, before the target file of the software is compressed to obtain the compressed file, the target file further needs to be obtained. For a specific obtaining manner, there may be the following possible implementations:

One possible implementation is: All files included in the software are determined, and the files form a file set; and then each file in the file set is screened according to a preset value of a file size. If a size of a file is greater than a second threshold, the file is determined as the target file.

Another possible implementation is: All files included in the software are determined to form a file set, and when a total size of all files in the file set is greater than a third threshold, each file in the file set is used as the target file. In the technical solution provided in this application, a size of the file included in the software is screened, a file whose size is extremely small is not compressed, and this helps to more effectively save system resources.

Optionally, in this embodiment of this application, after the target file of the software is compressed to obtain the compressed file, the following steps may be further performed: storing the compressed file; establishing an index file and deleting the target file, where the index file includes the identifier of the software, an identifier of the compressed file, a storage location of the compressed file, and a release location, and the release location is used for indicating a location in which the compressed file is stored after being decompressed; and generating an index table according to the index file.

In the solution provided in this embodiment of this application, when being stored, the compressed file may be directly stored in a directory corresponding to the software, or the compressed file may be stored in a same fixed location, provided that the compressed file may be stored. This is not limited herein. In addition, the identifier of the compressed file and the identifier of the software may be in multiple manners, for example, a name is used as an identifier or a time at which compression is performed is used as an identifier, provided that the software and the compressed file can be correctly identified. This is not limited herein.

In the technical solution provided in this application, the index file is generated after the file is compressed, and this helps to search for a necessary startup file when the software is used again.

Optionally, in this embodiment of this application, based on the foregoing method for processing the compressed file, when the software is started, the compressed file of the software may be further queried in the following manner: The identifier of the compressed file corresponding to the software, the storage location of the compressed file, and the release location of the compressed file are queried according to the identifier that is of the software and that is included in the startup instruction and the index table; and then the compressed file is queried in the storage location according to the identifier of the compressed file.

Before the index table is used, when a device is started, the index table may be wholly loaded into a memory or partly loaded into the memory, provided that the index table may be used, and a loading manner is not limited.

In the solution provided in this embodiment of this application, the compressed file of the software is found by using the index table, so that a storage is prevented from being fully scanned, and time is saved, that is, a starting speed of the software is increased.

Optionally, in this embodiment of this application, a specific method for decompressing the compressed file by using the high-priority process is: decompressing the compressed file by using the high-priority process, to obtain the target file, and storing the target file in the release location.

In the solution provided in this embodiment of this application, the target file that is obtained by decompressing the compressed file is directly stored in the release location, so that it is convenient to invoke the target file when the software is started.

According to a second aspect, an embodiment of this application provides a data processing device, the data processing device has a function for implementing the foregoing method, and the function may be implemented by hardware, or may be implemented by hardware by executing corresponding software. The hardware or the software includes one or more modules corresponding to the foregoing function.

In a possible implementation, the data processing device includes:

a processing module, configured to: obtain a usage frequency value of software, and when the usage frequency value is less than a first threshold, compress a target file of the software to obtain a compressed file; and a receiving module, configured to receive a startup instruction that is for starting the software and that includes an identifier of the software, where the processing module is further configured to: query the compressed file of the software according to the startup instruction received by the receiving module; decompress the compressed file by using the high-priority process, to obtain the target file, where the high-priority process is performed as an essential highest-priority process relative to another process; and start the software based on the target file.

In another possible implementation, a structure of the data processing device includes:

an input unit, a processor, a storage, and a bus, where the input unit, the processor, and the storage are connected by using the bus; and the processor performs the following steps:

obtaining a usage frequency value of software; when the usage frequency value is less than a first threshold, compressing a target file of the software to obtain a compressed file; obtaining a startup instruction, where the startup instruction includes an identifier of the software; querying the compressed file of the software according to the startup instruction; decompressing the compressed file by using the high-priority process, to obtain the target file, where the high-priority process is performed as an essential highest-priority process relative to another process; and starting the software based on the target file.

According to a third aspect, an embodiment of this application provides a computer storage medium, the computer storage medium stores program code, and the program code is used for instructing to execute the method of the foregoing first aspect.

DESCRIPTION OF EMBODIMENTS

Embodiments of this application provide a data processing method and device, to collect statistics about a usage frequency value of software, and determine whether the usage frequency value is less than a first threshold. If the usage frequency value is less than the first threshold, a terminal determines the software as low frequency software, and compresses a file of the low frequency software. In this way, system resources can be more effectively saved.

To make persons skilled in the art understand the technical solutions in the present invention better, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

With popularization of intelligent devices, a variety of software is loaded in the device, and frequency of using each piece of software by different groups of people is different. Consequently, there may be some software whose frequency of use is extremely low (low frequency software), and some large files may be used by the low frequency software. However, system resources of the device are limited, and when the file corresponding to the low frequency software occupies a large amount of system resources, execution efficiency of other software is affected. Consequently, the device cannot run smoothly, and user experience is affected.

To resolve this problem, the embodiments of this application provide the following technical method: obtaining a usage frequency value of software; when the usage frequency value is less than a first threshold, compressing a target file of the software to obtain a compressed file; receiving a startup instruction for starting the software, where the startup instruction includes an identifier of the software; querying the compressed file of the software according to the identifier of the software; decompressing the compressed file by using the high-priority process, to obtain the target file, where the high-priority process is performed as an essential highest-priority process relative to another process; and starting the software based on the target file.

The data processing device mentioned in the embodiments of this application may be a device that provides a user with voice and/or data connectivity, a handheld device with a radio connection function, or another processing device connected to a wireless modem. A wireless terminal may communicate with one or more core networks through a radio access network (Radio Access Network, RAN for short). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (Personal Communication Service, PCS for short) phone, a cordless telephone set, a Session Initiation Protocol (SIP) phone, a wireless local loop (Wireless Local Loop, WLL for short) station, or a personal digital assistant (Personal Digital Assistant, PDA for short). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

Figure 1:
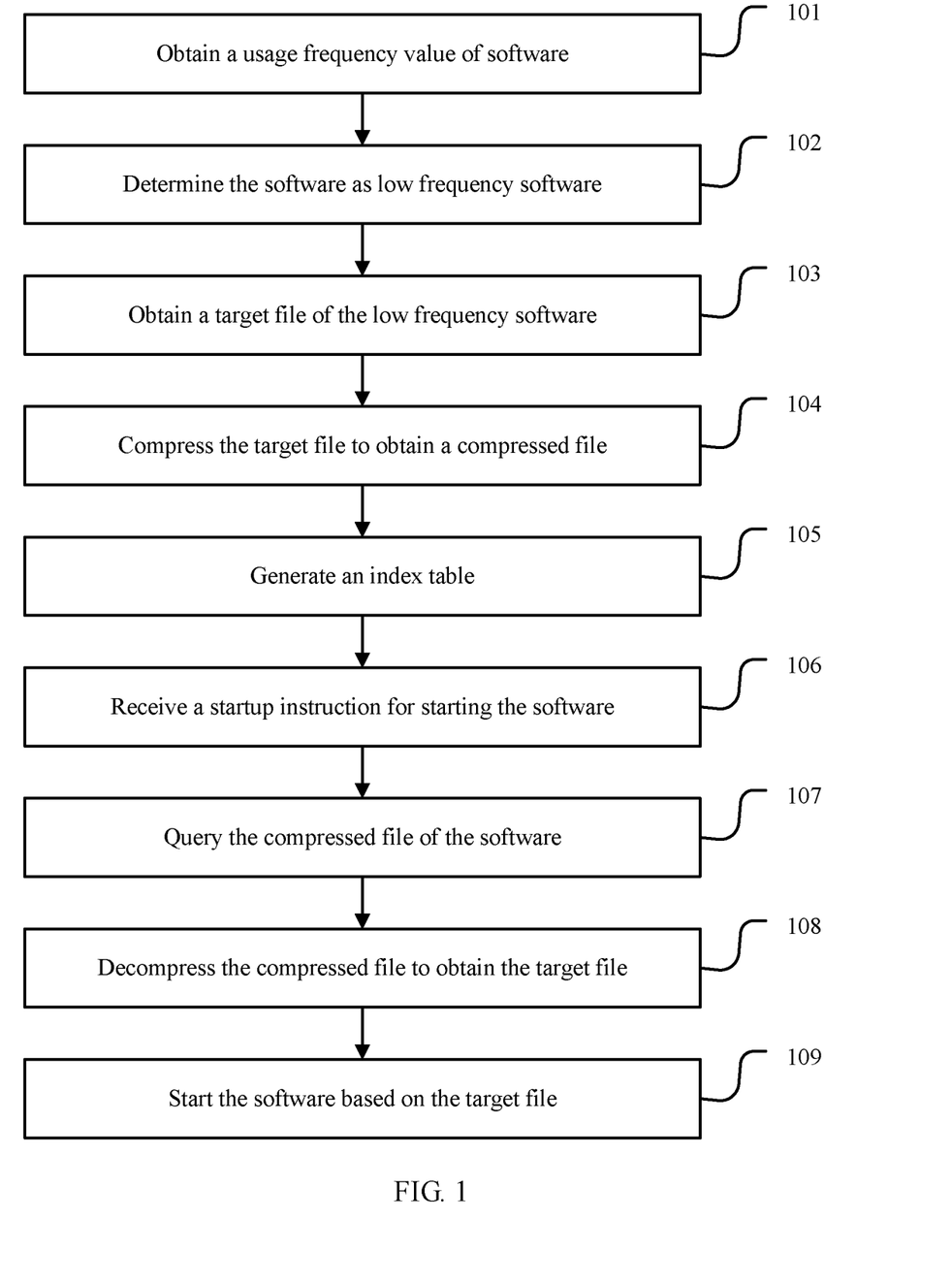
FIG. 1 is a schematic diagram of an embodiment of a data processing method according to an embodiment of this application.

The data processing device in the embodiments of this application includes an input unit, a processor, and a storage, and the input unit, the processor, and the storage have a function of implementing the following method. For ease of understanding, a specific procedure in the embodiments of this application is described below. For details, refer to FIG. 1. An embodiment of the data processing method according to the embodiments of this application includes the following steps:

101. Obtain a usage frequency value of software.

A data processing device collects statistics about times of using the software in a time period in a regular use process, and the data processing device uses the times of usage in this time period as the usage frequency value of the software. A Baidu map is used as an example in this embodiment. For example, if statistics about times of using the Baidu map software that are collected by the data processing device in one month are 10 times, a usage frequency value of the Baidu map is 10 times per month.

Multiple methods for collecting statistics about times of using the software are available for the data processing device. For example, data is recorded once each time the software is started, or data is recorded once only after the software runs for two minutes, provided that times of using the software can be correctly reflected. In addition, a time of running the software may be set by a user, and is not specifically limited herein.

102. Determine the software as low frequency software.

After the data processing device determines the usage frequency value of the software, the data processing device compares the usage frequency value with a first threshold, and if the usage frequency value is less than the first threshold, determines the software as the low frequency software. For example, if the usage frequency value of the Baidu map that is obtained by the data processing device is 10 times per month, and a preset usage frequency value is 15 times per month, the data processing device determines the Baidu map as low frequency software.

103. Obtain a target file of the low frequency software.

After determining the software as the low frequency software, the data processing device may obtain a compressible file of the low frequency software to form a file set. The data processing device compares a size of each file in the file set with a preset file size, and if the preset file size is exceeded, the data processing device determines the file as a target file. For example, if the file size preset by the user is 1 MB, it indicates that only a file whose size is greater than 1 MB in the file set is determined as a target file. Alternatively, the data processing device may use all files in the file set of the low frequency software as target files, and the data processing device may determine a total size of all files in the compressible file. For example, only when the total size is greater than 20 MB, the target files are compressed. Alternatively, the data processing device may not determine the file size, and a specific method is not limited herein. In this embodiment of this application, the user may set a specific manner in which the data processing device selects the target file, and this is not limited herein.

The compressible file in this embodiment of this application includes but is not limited to a data-type file such as a picture, a font, audio, and a video, for example, an offline map or a font in the Baidu map.

104. Compress the target file to obtain a compressed file.

The data processing device compresses the determined target file to obtain the compressed file, sets an identifier for the compressed file, stores the compressed file, and determines a release location of the compressed file after being decompressed.

In this embodiment of this application, a compression manner selected by the data processing device includes but is not limited to a "zip" format, a "tar" format, or a "rar" format for compression, and a specific method is not limited herein. The identifier set by the data processing device for the compressed file may be named by using a name or a time at which compression is performed, provided that the compressed file may be correctly indicated. This is not limited herein. For example, when the Baidu map is compressed at 14:00 in the afternoon, a compressed file may be named as Baidu map or 14:00. In addition, when the data processing device stores the compressed file, a storage location may be a file directory corresponding to the low frequency software, or may be a new address that is established for storage, and is not limited herein.

105. Generate an index table.

The data processing device establishes an index file, where the index file includes the identifier of the compressed file, an identifier of the low frequency software, the storage location of the compressed file, and the release location of the compressed file, and generates the index table according to multiple index files.

In this embodiment, the storage location of the compressed file may be multiple paths. For example, when the data processing device is a mobile phone, data is usually stored in a secure digital memory card (Secure Digital Memory Card, sdcard for short). When a compressed file of the Baidu map is stored, a new storage directory /sdcard/compressed data may be established to store compressed data, that is, an address is specially established for the compressed data. Alternatively, the compressed file may be stored in the following storage directory: /sdcard/baidu/data, where baidu is a directory name of the Baidu map in the sdcard. This may be set by the user, and is not limited herein.

The index table may be loaded into a memory when the data processing device is started. However, there may be multiple manners in which the index table is loaded into the memory, for example, wholly loaded at a time or partly loaded, and this is not limited herein.

106. Receive a startup instruction for starting the software.

The data processing device receives the startup instruction for starting the software, and the startup instruction includes the identifier of the software. For example, the identifier of the software is Baidu map.

107. Query the compressed file of the software.

The data processing device performs querying in the index table by using the identifier of the software, and if the identifier of the software exists in the index table, the data processing device determines that the software is low frequency software. The data processing device queries the index file corresponding to the low frequency software by using the index table, and obtains the identifier of the compressed file corresponding to the low frequency software, the storage location of the compressed file, and the release location of the compressed file by using the index file. If the identifier of the software does not exist in the index table, the data processing device determines that the software is not low frequency software, and a storage of the data processing device is fully scanned to obtain the compressed file of the software by means of querying.

108. Decompress the compressed file to obtain the target file.

The data processing device suspends the software and simultaneously allocates a new high-priority process, or the new high-priority process is previously appointed. The high-priority process herein is performed as an essential highest-priority process relative to another process. The data processing device decompresses the compressed file by using the high-priority process, to obtain the target file. The data processing device stores the target file in the release location after obtaining the target file.

In an actual application, the another process herein may include a process on an application layer. Because a system layer is relatively important, during process allocation, some processes on the system layer may obtain a relatively high priority. For example, there is a process A for power status detection, a process B for microblog running, and a process C for mobile banking running. In an actual application, the data processing device is required to continuously run, and therefore power status detection needs to be performed in real time, so that the user is reminded to charge the data processing device when power is lower than a value, thereby ensuring continuous running. Therefore, a priority of the process A may be the highest in the four processes. Microblog is software on the application layer, and the user may not have a high requirement for a running status of microblog, and therefore, a priority of the process B may be ranked at a rearward location. Although mobile banking is software on the application layer, in an actual application, mobile banking is related to personal financial security of the user. Therefore, a priority of the process C may be ranked at a front location, that is, may be higher than that of the process B. When the Baidu map is started, a priority of a process D that is allocated by the data processing device to the Baidu map may be lower than that of the process A and the process C, but higher than that of the process B for microblog running. A specific method and requirement for allocating the process may be set by the user, and are not limited herein.

109. Start the software based on the target file.

The data processing device invokes the target file to start the software. For example, when the data processing device currently needs to start the Baidu map, but the data processing device is in a scenario in which only mobile data can be used, in this case, the data processing device may invoke and run an offline map of the Baidu map, and the offline map is a target file of the Baidu map software.

In this embodiment of this application, the data processing device determines whether the software is the low frequency software by using the usage frequency value. When the software is the low frequency software, the data processing device compresses the target file of the low frequency software to obtain the compressed file. In this way, system resources of the data processing device may be effectively saved. After the foregoing compression step, the data processing device may establish the index table and rapidly find the compressed file by using the index table in the decompression process, and before starting the software, perform decompression by using the high-priority process. In this way, a running process of the software may be kept fluent.

The data processing method in the embodiments of this application is described above, and the data processing device in the embodiments of this application is described below.

Figure 2:
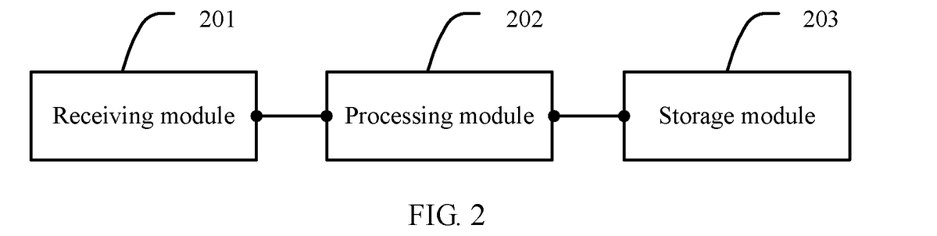
FIG. 2 is a schematic diagram of an embodiment of a data processing device according to an embodiment of this application.

For details, refer to FIG. 2. A data processing device according to an embodiment of this application includes: a receiving module 201, a processing module 202, and a storage module 203.

The processing module 202 is configured to: obtain a usage frequency value of software, and when the usage frequency value is less than a first threshold, compress a target file of the software to obtain a compressed file.

The receiving module 201 is configured to receive a startup instruction for starting the software, where the startup instruction includes an identifier of the software.

The processing module 202 is further configured to: query the compressed file of the software according to the identifier that is of the software and that is received by the receiving module; decompress the compressed file by using a high-priority process, to obtain the target file, where the high-priority process is performed as an essential highest-priority process relative to another process; and start the software based on the target file.

With reference to the foregoing method embodiment, the processing module 202 is further specifically configured to collect statistics about times of using the software in a unit time period as the usage frequency value of the software.

With reference to the foregoing embodiment, the data processing device further includes the storage module 203, and the storage module 203 is configured to store the compressed file.

The processing module 202 is further configured to: establish an index file and delete the target file, where the index file includes the identifier of the low frequency software, an identifier of the compressed file, a storage location of the compressed file, and a release location, and the release location is used for indicating a location in which the compressed file is stored after being decompressed; and generate an index table according to the index file.

The processing module 202 is further specifically configured to: query the identifier of the compressed file, the storage location of the compressed file, and the release location of the compressed file according to the identifier of the software and the index table; and query the compressed file in the storage location according to the identifier of the compressed file.

The processing module 202 is further specifically configured to decompress the compressed file by using the high-priority process, to obtain the target file.

The storage module 203 is further configured to store the target file obtained after decompression in the release location.

In this embodiment of this application, the processing module 202 collects statistics about times of using the software in a preset time as the usage frequency value of the software, and determines whether the usage frequency value is less than the first threshold. When the usage frequency value is less than the first threshold, the processing module 202 determines the software as the low frequency software and obtains the target file of the low frequency software. Then, the processing module 202 compresses the target file. In this way, system resources of the data processing device can be effectively saved in the compression process. After the processing module completes compression work of the target file, the processing module 202 generates the index file based on the previous compression work and forms the index table. When the receiving module 201 receives the startup instruction for starting the low frequency software, the processing module 202 finds the compressed file of the low frequency software by using the index table, and the processing module 202 performs decompression by using the high-priority process, and starts the low frequency software based on the target file after the decompression is completed. The corresponding compressed file can be rapidly found in the decompression process, and in a process of starting the software, the compressed file is decompressed by using the high-priority process and then the software is started, so that the software runs smoothly.

Figure 3:
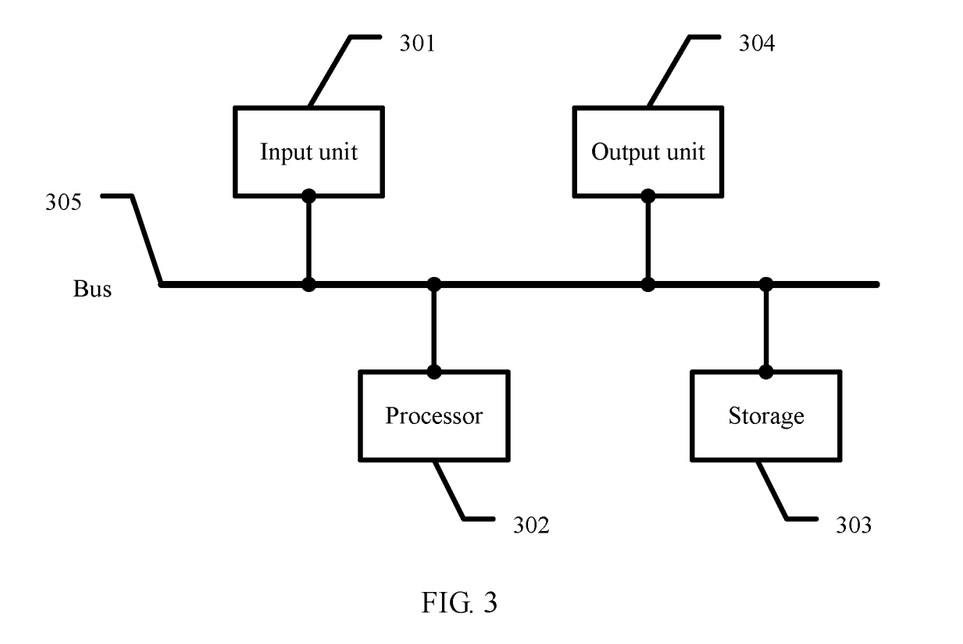
FIG. 3 is a schematic diagram of another embodiment of a data processing device according to an embodiment of this application.

For details, refer to FIG. 3. For ease of description, in another embodiment of the data processing device according to the embodiments of this application, only a part related to this embodiment of this application is shown. For specific technical details that are not disclosed, refer to the method part of the embodiments of this application. The data processing device may be any terminal device, including a mobile phone, a tablet computer, a personal digital assistant (Personal Digital Assistant, PDA for short), a point of sales (Point of Sales, POS for short), an in-vehicle computer, and the like. FIG. 3 shows a partial structural block diagram related to the data processing device provided in this embodiment of this application. Referring to FIG. 3, the data processing device includes: an input unit 301, a processor 302, a storage 303, an output unit 304, and a bus 305. Persons skilled in the art may understand that a structure of the data processing device shown in FIG. 3 constitutes no limitation on the data processing device, and the data processing device may include components more or fewer than those shown in the figure, or a combination of some components, or different component arrangements.

The constituent parts of the data processing device are described below in detail with reference to FIG. 3.

The storage 303 may be configured to store a software program and a module, and the processor 302 executes, by running the software program and the module that are stored in the storage 303, various functional applications and data processing of the data processing device. The storage 303 may mainly include a program storage area and a data storage area, where the program storage area may store an operating system, an application program that is required by at least one function (such as a sound playing function or an image playing function), and the like, and the data storage area may store data (such as audio data or video data) that is created according to use of the data processing device, and the like. In addition, the storage 303 may include a high-speed random access memory, and may further include a nonvolatile memory, such as at least one magnetic disk storage component, a flash memory component, or another volatile solid-state storage component.

The input unit 301 may be configured to: receive entered digit or character information, and generate key signal input related to user setting and function control of the data processing device. Specifically, the input unit 301 may include a touch panel and another input device. The touch panel, also referred to as a touchscreen, may collect a touch operation (such as an operation performed by a user on the touch panel or near the touch panel by using any proper object or accessory, such as a finger or a stylus) of the user on or near the touch panel, and drives a corresponding connection apparatus according to a preset program. Optionally, the touch panel may include two parts: a touch detection apparatus and a touch controller. The touch detection apparatus detects a touch position of a user, detects a signal brought by the touch operation, and sends the signal to the touch controller. The touch controller receives touch information from the touch detection apparatus, converts the touch information into touch point coordinates, sends the touch point coordinates to the processor 302, and can receive and execute a command sent by the processor 302. In addition, the touch panel may be implemented in multiple types, such as a resistive type, a capacitive type, infrared, and a surface acoustic wave. The input unit 301 may include another input device in addition to the touch panel. Specifically, the another input device may include but is not limited to one or more of a physical keyboard, a function key (such as a volume control key or an on/off key), a trackball, a mouse, or a joystick.

The output unit 304 may include but is not limited to a display apparatus. The display apparatus may be configured to display information entered by the user or information provided for the user and various menus of the mobile phone. The display apparatus may include a display panel. Optionally, a form such as a liquid crystal display (Liquid Crystal Display, LCD for short) and an organic light-emitting diode (Organic Light-Emitting Diode, OLED for short) may be used to configure the display panel. Further, the touch panel may cover the display panel. When detecting the touch operation on or near the touch panel, the touch panel sends the touch operation to the processor 302 to determine a type of a touch event, and then the processor 302 provides corresponding visual output on the display panel according to the type of the touch event. In some embodiments, the touch panel and the display panel may be integrated to implement input and output functions of the data processing device.

The bus 305 may be a peripheral component interconnect (peripheral component interconnect, PCI for short) bus or an extended industry standard architecture (extended industry standard architecture, EISA for short) bus, or the like. The bus may be classified into an address bus, a data bus, a control bus, and the like. For ease of representation, only one bold line is used in FIG. 3 for representation, but it does not indicate that there is only one bus or one type of bus.

The processor 302 is a control center of the data processing device, and uses various interfaces and lines to connect all parts of the entire data processing device. By running or executing the software program and/or the module stored in the storage 303 and invoking the data stored in the storage 303, the processor 302 executes various functions and data processing of the data processing device, so as to perform overall monitoring on the data processing device. Optionally, the processor 302 may include one or more processing units. Preferably, the processor 302 may integrate an application processor and a modem processor. The application processor mainly processes an operating system, a user interface, an application program, and the like; and the modem processor mainly processes wireless communication. It may be understood that the foregoing modem processor may be not integrated into the processor 302. The processor 302 may be a central processing unit (central processing unit, CPU for short), a network processor (network processor, NP for short), or a combination of the CPU and the NP. The processor 302 may further include a hardware chip. The foregoing hardware chip may be an application-specific integrated circuit (application-specific integrated circuit, ASIC for short), a programmable logic device (programmable logic device, PLD for short), or a combination thereof. The foregoing PLD may be a complex programmable logic device (complex programmable logic device, CPLD for short), a field-programmable gate array (field-programmable gate array, FPGA for short), a generic array logic (generic array logic, GAL for short), or any combination thereof.

As shown in FIG. 3, the processor 302 of the data processing device further has the following functions: obtaining a usage frequency value of software; when the usage frequency value is less than a first threshold, compressing a target file of the software to obtain a compressed file; obtaining and receiving a startup instruction for starting the software; querying the compressed file of the software; and decompressing the compressed file by using the high-priority process, to obtain the target file, where the high-priority process is performed as an essential highest-priority process relative to another process; and starting the software based on the target file.

Optionally, the processor 302 further specifically has the following function: collecting statistics about times of using the software in a unit time as the usage frequency value of the software.

Optionally, referring to FIG. 3, the storage 303 of the data processing device further has the following function: storing the compressed file.

The processor 302 further has the following functions: establishing an index file and deleting the target file, where the index file includes an identifier of the software, an identifier of the compressed file, a storage location of the compressed file, and a release location, and the release location is used for indicating a location in which the compressed file is stored after being decompressed; and generating an index table according to the index file.

Optionally, the processor 302 further has the following functions: querying the identifier of the compressed file, the storage location of the compressed file, and the release location of the compressed file according to the identifier of the software and the index table; and querying the compressed file in the storage location according to the identifier of the compressed file.

Optionally, the processor 302 further has the following function: decompressing the compressed file by using the high-priority process, to obtain the target file.

The storage 303 further has the following function: storing the target file obtained after decompression in the release location. Optionally, the storage 303 may be further configured to store a program instruction, and the processor 302 invokes the program instruction stored in the storage 303, and may perform one or more steps or optional implementations in the embodiment shown in FIG. 1, to implement functions of the data processing device in the foregoing method.

In this embodiment of this application, the processor 302 collects statistics about times of using the software in a preset time as the usage frequency value of the software, and determines whether the usage frequency value is less than the first threshold. When the usage frequency value is less than the first threshold, the processor 302 determines the software as low frequency software and obtains the target file of the low frequency software. Then, the processor 302 compresses the target file. In this way, system resources of the data processing device can be effectively saved in the compression process. After the processing module completes compression work of the target file, the processor 302 generates the index file based on the previous compression work and forms the index table. When the input unit 301 receives the startup instruction for starting the low frequency software, the processor 302 finds the compressed file of the low frequency software by using the index table, and the processor 302 allocates the high-priority process to perform decompression, and starts the low frequency software based on the target file after the decompression is completed. The corresponding compressed file can be rapidly found in the decompression process, and in a process of starting the software, the compressed file is decompressed by using the high-priority process and then the software is started, so that the software runs smoothly.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method performed by a data processing device, comprising:
    obtaining, from the data processing device, a usage frequency value of software, wherein the usage frequency value is less than a first threshold, and wherein the usage frequency value is based on statistics about times of using the software in the data processing device;
    compressing a target file of the software to obtain a compressed file of the software;
    obtaining a startup instruction comprising an identifier of the software for starting the software;
    querying the compressed file of the software according to the identifier of the software;
    decompressing the compressed file of the software using a high-priority process to obtain the target file of the software, the high-priority process being performed as an essential highest-priority process relative to another process; and
    starting the software based on the target file of the software.

2. The method of claim 1, wherein obtaining the usage frequency value of the software comprises collecting statistics about times of using the software in a unit time as the usage frequency value of the software.

3. The method of claim 1, wherein the target file of the software comprises a file whose file size is greater than a second threshold in a file set comprised in the software.

4. The method of claim 1, wherein after compressing the target file of the software to obtain the compressed file of the software, and before the startup instruction for starting the software is received, the method further comprises:
    storing the compressed file of the software;
    establishing an index file and deleting the target file of the software, the index file comprising the identifier of the software, an identifier of the compressed file of the software, a storage location of the compressed file of the software, and a release location, and the release location being used for indicating a location in which the compressed file of the software is stored after being decompressed; and
    generating an index table according to the index file.

5. The method of claim 4, wherein querying the compressed file of the software comprises:
    querying the identifier of the compressed file of the software, the storage location of the compressed file of the software, and the release location according to the identifier of the software and the index table; and
    querying the compressed file of the software in the storage location according to the identifier of the compressed file of the software.

6. The method of claim 1, wherein decompressing the compressed file of the software to obtain the target file comprises:
    decompressing the compressed file of the software using the high-priority process; and
    storing the target file of the software obtained after decompression in a release location.

7. The method of claim 1, wherein the target file of the software comprises any file in a file set, and a total size of files in the file set being greater than a third threshold.

8. A data processing device, comprising:
    a non-transitory computer-readable storage medium storing programming instructions; and
    at least one processor coupled to the non-transitory computer-readable storage medium, the programming instructions causing the at least one processor to be configured to:
        obtain, from the data processing device, a usage frequency value of software, wherein the usage frequency value is less than a first threshold, and wherein the usage frequency value is based on statistics about times of using the software in the data processing device;
        compress a target file of the software to obtain a compressed file of the software;
        obtain a startup instruction comprising an identifier of the software for starting the software;
        query the compressed file of the software according to the identifier of the software;
        decompress the compressed file of the software using a high-priority process to obtain the target file of the software, the high-priority process being performed as an essential highest-priority process relative to another process; and
        start the software based on the target file of the software.

9. The data processing device of claim 8, wherein in response to obtaining the usage frequency value of the software, the programming instructions further cause the at least one processor to be configured to collect statistics about times of using the software in a unit time as the usage frequency value of the software.

10. The data processing device of claim 8, wherein the target file of the software comprises a file whose file size is greater than a second threshold in a file set comprised in the software.

11. The data processing device of claim 8, wherein the target file of the software comprises any file in a file set, and a total size of files in the file set being greater than a third threshold.

12. The data processing device of claim 8, wherein the programming instructions further cause the at least one processor to be configured to:
    store the compressed file of the software;
    establish an index file and delete the target file of the software, the index file comprising the identifier of the software, an identifier of the compressed file of the software, a storage location of the compressed file of the software, and a release location, and the release location being used for indicating a location in which the compressed file of the software is stored after being decompressed; and
    generate an index table according to the index file.

13. The data processing device of claim 12, wherein in response to querying the compressed file of the software, the programming instructions further cause the at least one processor to be configured to:
query the identifier of the compressed file of the software, the storage location of the compressed file of the software, and the release location according to the identifier of the software and the index table; and
query the compressed file in the storage location according to the identifier of the compressed file.

14. The data processing device of claim 8, wherein in response to decompressing the compressed file of the software to obtain the target file of the software, the programming instructions further cause the at least one processor to be configured to:
decompress the compressed file of the software using the high-priority process; and
store the target file obtained after decompression in a release location.

15. A computer program product comprising computer-executable instructions stored on a non-transitory computer readable medium that, when executed by a processor, cause a terminal to:
obtain, from a mobile device coupled to the processor, a usage frequency value of software, wherein the usage frequency value is less than a first threshold, and wherein the usage frequency value is based on statistics about times of using the software in the mobile device;
compress a target file of the software to obtain a compressed file of the software;
obtain a startup instruction comprising an identifier of the software for starting the software;
query the compressed file of the software according to the identifier of the software;
decompress the compressed file of the software using a high-priority process to obtain the target file of the software, the high-priority process being performed as an essential highest-priority process relative to another process; and
start the software based on the target file of the software.

16. The computer program product of claim 15, wherein the computer-executable instructions further cause the terminal to collect the statistics about times of using the software in a preset unit of time as the usage frequency value of the software.

17. The computer program product of claim 15, wherein the computer-executable instructions further cause the terminal to:
identify a plurality of files associated with the software;
compare a size of each file of the plurality of files to a second threshold; and
when the size of the file is greater than the second threshold, select the file as the target file.

18. The computer program product of claim 15, wherein the computer-executable instructions further cause the terminal to:
identify a plurality of files associated with the software; and
when a total size of the plurality of files is greater than a second threshold, select each file of the plurality of files as the target file.

19. The computer program product of claim 15, wherein the computer-executable instructions further cause the terminal to:
identifying a plurality of files associated with the software; and
when a total size of the plurality of files is greater than a second threshold, compare a size of each file of the plurality of files to a third threshold; and
when the size of the file is greater than the third threshold, select the file as the target file.

20. The computer program product of claim 15, wherein the computer-executable instructions further cause the terminal to:
store the target file of the software obtained after decompression in a release location; and
invoking the target file when the software is started.

* * * * *